United States Patent [19]
Margraf

[11] 3,887,343
[45] June 3, 1975

[54] POCKET OR BAG FILTER WITH DUST RECIRCULATION

[76] Inventor: Adolf Margraf, 4961 Wendthagen, Im Haberkamp 196, Germany

[22] Filed: Mar. 22, 1973

[21] Appl. No.: 343,804

[30] Foreign Application Priority Data
Mar. 28, 1972 Germany............................ 2214983

[52] U.S. Cl. ...................... 55/262; 55/341; 55/430; 55/432; 55/466; 55/467; 55/484; 55/DIG. 25
[51] Int. Cl. ............................................ B01d 51/04
[58] Field of Search ............. 55/430, 431, 432, 433, 55/428, 466, 341, 302, 338, 339, 340, 467, 484, 262, 124, 97; 415/168; 302/48

[56] References Cited
UNITED STATES PATENTS

| | | | |
|---|---|---|---|
| 543,133 | 7/1895 | Heine................................ | 55/430 X |
| 1,784,339 | 12/1930 | Clasen et al. ...................... | 55/341 X |
| 1,853,393 | 4/1932 | Anderson........................... | 55/124 X |
| 2,717,658 | 9/1955 | Bethea et al....................... | 55/124 X |
| 3,473,300 | 10/1969 | Wilm et al. ........................ | 55/341 X |

FOREIGN PATENTS OR APPLICATIONS

| | | | |
|---|---|---|---|
| 348,424 | 5/1931 | United Kingdom................... | 55/302 |
| 707,684 | 4/1965 | Canada................................... | 55/97 |

*Primary Examiner*—Frank W. Lutter
*Assistant Examiner*—Kathleen J. Prunner
*Attorney, Agent, or Firm*—Karl F. Ross; Herbert Dubno

[57] ABSTRACT

A filter housing, divided into a purification chamber with a row of parallel filter sections and an adjoining exit manifold communicating with these filter sections, forms a dustcollecting trough extending beneath the row of filter sections and an upright return air shaft communicating at its lower end with that trough, this air shaft entering an inlet duct through which incoming dust-laden gas is supplied to the filter sections. A screw conveyor in the dust-collecting trough has two portions for delivering predetermined fractions of the accumulating dust to a discharge duct at one end of the trough and to the return air shaft at its opposite end; the latter fraction is driven by compressed air from a blower through that shaft into the inlet duct to agglomerate with the arriving fine dust, thereby preventing clogging of the filter surfaces by small particles.

5 Claims, 3 Drawing Figures

3,887,343

POCKET OR BAG FILTER WITH DUST RECIRCULATION

The present invention relates to a pocket or bag filter for purifying dust-laden gases by a method described in my copending application Ser. No. 230,721, filed March 1, 1972, now U.S. Pat. No. 3,834,123, according to which the solids dislodged from the filter surfaces by reverse-flow scavenging and/or joggling drop into a lower collecting trough and are recirculated to the filter sections at a rate substantially higher than the arrival rate of fine dust in the dust-laden gas, the incident dust being extracted from the filter at a rate commensurate with that arrival rate. Reference in this connection may also be made to my copending application Ser. No. 343,802, filed Mar. 22, 1973.

Pursuant to the disclosure of my prior application Ser. No. 230,721, agglomeration of dust particles is achieved by extracting the particles dislodged from the filter surfaces at one end of the longitudinally extending dust-collecting trough and delivering them by gravity to a container with an airtight, adjustable transfer device by which they are fed pneumatically to the gas-inlet duct upstream of the filter. I have found that under certain circumstances, in the practice of this method, obstructions can occur in the inlet duct which lead to a breakdown in the operation of the filter and which are attributable to the fact that, depending on the type of dust contained in the incoming gas, very large quantities of dust may be present in the circuit and thus give rise to a risk of blockage.

It is an object of the invention therefore to provide means in such an apparatus for recirculating large amounts of dust to the filter sections in such a way that the risk of blockage is minimized or substantially eliminated.

I achieve this object by disposing an extractor in the trough extending longitudinally beneath the row of parallel filter sections, the extractor carrying two conveyor elements for delivering predetermined fractions of accumulated dust (determined by the arrival rate of fine dust with the incoming gas to be purified) to a discharge duct at one end of the trough, which may be equipped with a bucket wheel, and in the opposite direction to a return channel at the other end of the trough, this channel being an upright air shaft whose lower end is connected to the pressure side of a blower and whose upper end opens into a supply duct for the dust-laden gas.

The dust particles to be recirculated thus remain continuously in the filter housing so that there is no longer any need for a container with airtight adjustable transfer means for the purpose of reintroducing dislodged dust particles into the inlet side of the filter.

To avoid blockages at the pressure side of the blower when the filtering plant is shut down, the discharge port of the blower is preferably connected to the bottom end of the return air shaft through a trap-like conduit of gooseneck shape.

In order that the invention may be more clearly understood, reference will now be made to the accompanying drawing in which.

Figures 1, 2, 3:
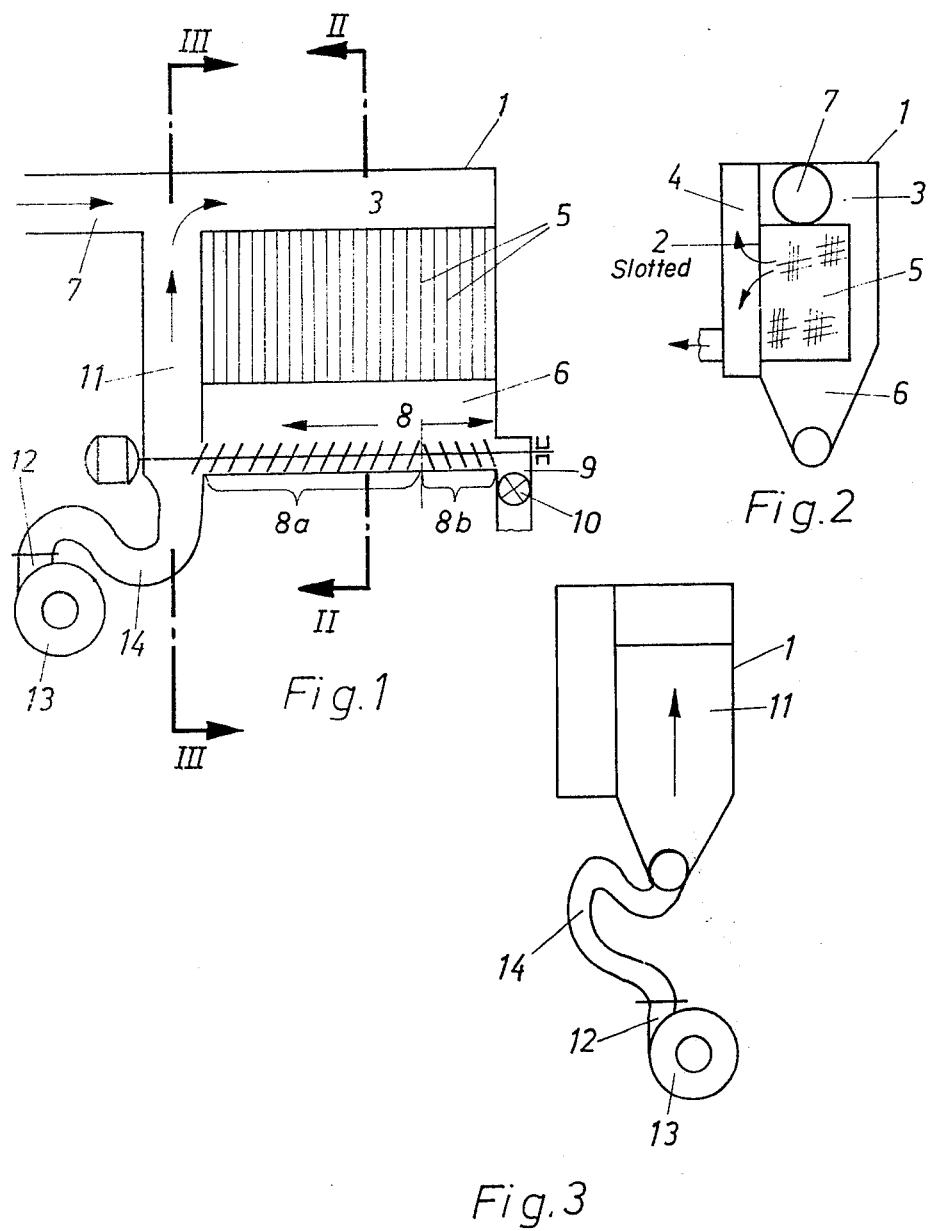
FIG. 1 shows schematically, in vertical longitudinal section, a pocket filter according to the invention.
FIG. 2 shows a section along the line II—II of FIG. 1.
FIG. 3 shows a section along the line III—III of FIG. 1.

As shown in the drawing, a filter housing 1 is divided into a first chamber 3, defining a purification or dust-removal space, and a second chamber 4, defining a clean-gas space or exit manifold, by a slotted wall 2 through which the latter space communicates with a multiplicity of filter pockets 5 as indicated by arrows in FIG. 2. The filter sections 5, which are situated in the dust-removal space 3 and are penetrated by the dust-laden gas from the outside in, are fastened in a row to the slotted wall or partition 2. Underneath the filter pockets or sections 5, which are cleansed by reverse-flow scavenging and/or joggling to regenerate the filter, I provide a longitudinally extending dust-collecting trough 6 receiving the dust particles which are detached from the surfaces of the filter pockets. In the upper part of housing 1, the incoming gas is fed to the dust-removal space by a supply duct 7; the clean gas is removed from the exit manifold 4.

In accordance with the invention, a transporter for accumulated solids is mounted in the lower part of the dust-collecting trough 6 which, in this embodiment, consists of a screw conveyor 8 split lengthwise into two parts 8a and 8b with opposite-handed threads. Alternatively, I may use two separately driven screw conveyors of opposite pitch and of appropriate length; other types of conveyors can also be used for this purpose. The part 8b of the feed screw conveys a fraction of the incident dust, which exceeds the recirculation capacity of part 8a and therefore which corresponds to the arrival rate of the dust contained in the incoming dust-laden gas, to an outlet 9 provided with a bucket wheel 10, where the dust is discharged from the apparatus.

The longer part 8a of the remaining fraction of the feed screw conveys the dust to a vertical return air shaft 11 at the end of the filter housing 1; the pressure side 12 of a blower 13 discharges into the bottom end of this air shaft 11 via a gooseneck 14. The dust conveyed into the air shaft 11 is carried upwards by the pressurized air from the blower 13 and is reintroduced, in the upper part of the filter housing 1, into the incoming stream of dust-laden gas to be purified; these recirculated particles enter the upper part of the pocket filter, which may be placed under partial vacuum, conjointly with the dust-laden gas, so that the arriving fine dust agglomerates with the dust recirculated from the dust-collecting trough 6 and increases in particle size whereby clogging of the filtering surfaces with fine dust is prevented. A fairly large amount of incident dust is thus continuously fed back to the filter so that the probability of the fine dust encountering dust already agglomerated is very high. Furthermore, the recirculated incident dust does not leave the filter housing so that sealed transfer means are no longer necessary and the risk of obstructions due to their presence is eliminated.

The trap-like bend 14 is provided in order to prevent any buildup of dust accumulations at the pressure side of the blower when the filter plant is shut down.

I claim:

1. A filtering apparatus comprising:

a housing provided with partition means dividing same into a purification chamber and an exit manifold, said purification chamber being subdivided into a multiplicity of parallel filter sections communicating with said exit manifold, said housing further forming a dust-collecting trough extending underneath said filter sections and communicating therewith;

a supply duct for incoming dust-laden gas to be purified, said supply duct opening onto said filter sections for delivering a continuous flow of said gas to filtering surfaces thereof adapted to retain accompanying solids;

extractor means in said trough for removing dust particles descending from said filter sections, said extractor means including a first and a second conveyor element for transporting predetermined fractions of accumulating dust to opposite ends of said trough, said housing being provided with a channel communicating with said supply duct and with one of the ends of said trough;

blower means communicating with said channel for driving one of said fractions of accumulated dust back into said supply duct; and discharge means at the other end of said trough for removing the other of said fractions from said housing.

2. A filtering apparatus as defined in claim 1 wherein said supply duct extends above said filter sections, said channel being an upright air shaft rising from said trough to said supply duct.

3. A filtering apparatus as defined in claim 1 wherein said blower means is provided with a gooseneck connection leading to the lower end of said air shaft.

4. A filtering apparatus as defined in claim 1 wherein said first and second conveyor elements are screw conveyors.

5. A filtering apparatus as defined in claim 4 wherein said screw conveyors are portions of a common feed screw provided with threads of opposite pitch.

* * * * *